(12) United States Patent (10) Patent No.: US 7,240,413 B2
Oguri et al. (45) Date of Patent: Jul. 10, 2007

(54) PROCESS AND DEVICE FOR PRODUCING CLUTCH FRICTION PLATE

(75) Inventors: Kensuke Oguri, Shizuoka (JP); Tsutomu Tsuboi, Shizuoka (JP); Akihiro Yamashita, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 419 days.

(21) Appl. No.: 10/913,497

(22) Filed: Aug. 9, 2004

(65) Prior Publication Data

US 2005/0133332 A1 Jun. 23, 2005

(30) Foreign Application Priority Data

Dec. 22, 2003 (JP) ............................. 2003-425562

(51) Int. Cl.
*B23P 23/04* (2006.01)
*F16D 13/68* (2006.01)
(52) U.S. Cl. .................... 29/33 R; 29/270; 192/70.17; 192/214; 156/515; 428/167
(58) Field of Classification Search ................ 29/270, 29/527.4, 527.2, 33 R, 33 K, 33 Q, 33 S; 192/113.36, 107 R, 3.29, 70.12, 70.14, 70.17, 192/214; 156/515, 263, 265; 428/167
See application file for complete search history.

(56) References Cited

U.S. PATENT DOCUMENTS

| | | | | |
|---|---|---|---|---|
| 3,048,250 | A | * | 8/1962 | Kershner ................. 192/107 R |
| 3,897,860 | A | * | 8/1975 | Borck et al. ............ 192/113.36 |
| 4,027,758 | A | * | 6/1977 | Gustavsson et al. ... 192/113.36 |
| 4,260,047 | A | * | 4/1981 | Nels ......................... 192/70.14 |
| 4,878,282 | A | * | 11/1989 | Bauer ........................ 29/527.4 |
| 5,094,331 | A | * | 3/1992 | Fujimoto et al. ........ 192/70.12 |
| 5,460,255 | A | * | 10/1995 | Quigley ................. 192/113.36 |
| 5,553,371 | A | * | 9/1996 | Uchino et al. ............. 29/527.2 |
| 5,571,372 | A | * | 11/1996 | Miyaishi et al. ............ 156/515 |
| 5,605,210 | A | * | 2/1997 | Koike et al. ................ 192/3.29 |
| 5,776,288 | A | * | 7/1998 | Stefanutti et al. ........... 156/263 |
| 5,858,511 | A | * | 1/1999 | Lisowsky ................... 428/167 |
| 5,897,737 | A | * | 4/1999 | Quigley ...................... 156/265 |

FOREIGN PATENT DOCUMENTS

| | | |
|---|---|---|
| CA | 2 233 833 | 4/1998 |
| EP | 0 806 586 A2 | 11/1997 |

(Continued)

*Primary Examiner*—Dana Ross
(74) *Attorney, Agent, or Firm*—Arent Fox LLP

(57) ABSTRACT

A process for producing a clutch friction plate in which a plurality of friction material segments are bonded to an annular flat face of an annular core plate so that oil channels are formed between the segments, the process including: a step of forming a plurality of strip-shaped friction materials by cutting a band-shaped friction material along its longitudinal direction; a step of aligning and holding portions, corresponding to the segments, of leading edge parts of the materials in positions above the core plate while positioning the portions in the peripheral direction and in the direction along one diameter of the core plate; a step of forming the segments by cutting off the leading edge parts of the materials positioned above the core plate along a cutting-off line that includes at least an arc line that follows the outer periphery of the core plate, and a step of pressing and bonding the segments onto the face coated with an adhesive.

2 Claims, 12 Drawing Sheets

FOREIGN PATENT DOCUMENTS

| | | |
|---|---|---|
| EP | 1 574 733 A1 | 9/2005 |
| JP | 63-077944 A | 4/1988 |
| JP | 64-074331 A | 3/1989 |
| JP | 4-68491 | 11/1992 |
| JP | 4-68494 | 11/1992 |
| JP | 10-318309 | 12/1998 |
| JP | 2001-090746 A | 4/2001 |

* cited by examiner

PROCESS AND DEVICE FOR PRODUCING CLUTCH FRICTION PLATE

BACKGROUND OF THE INVENTION

1. Field of the Invention

The present invention relates to an improvement of a process and a device for producing a clutch friction plate by bonding a plurality of friction material segments to an annular flat face of an annular core plate so that oil channels are formed between the friction material segments.

2. Background Art

Conventionally, for production of this type of friction plate, an arrangement in which a plurality of friction material segments obtained by cutting a band-shaped friction material at intervals in its longitudinal direction are bonded to an annular core plate (e.g., Japanese Patent Publication No. 4-68491) and an arrangement in which a plurality of friction material segments obtained by punching out from a band-shaped friction material are bonded to an annular core plate (e.g., Japanese Patent Publication No. 4-68494) are known.

However, in the arrangement disclosed in Japanese Patent Publication No. 4-68491, the friction material segments are obtained by cutting them in turn from the leading edge of the band-shaped friction material, which is fed in a direction along a tangent to the annular core plate, and are then bonded to the annular core plate, resulting in a low degree of freedom in the shape of the oil channels formed between the friction material segments. In the arrangement disclosed in Japanese Patent Publication No. 4-68494, the ratio of the area occupied by the friction material segments so obtained relative to the area of the band-shaped friction material required, that is, the yield, is low.

SUMMARY OF THE INVENTION

The present invention has been accomplished under the above-mentioned circumstances, and it is an object thereof to provide a process for producing a clutch friction plate, the process ensuring a high degree of freedom in the shape of the oil channels and an improved yield in the production of the friction material segments, as well as a device for producing the clutch friction plate, the device being capable of appropriately carrying out the production process.

In order to attain this object, in accordance with a first aspect of the present invention, there is proposed a process for producing a clutch friction plate by bonding a plurality of friction material segments to an annular flat face of an annular core plate so that oil channels are formed between the friction material segments, the process comprising: a step of forming a plurality of strip-shaped friction materials by cutting a band-shaped friction material along its longitudinal direction while feeding the band-shaped friction material in a direction along one diameter of the annular core plate; a step of aligning and holding portions, corresponding to the friction material segments, of leading edge parts of the plurality of strip-shaped friction materials in positions above the annular core plate while positioning the portions in the peripheral direction and in the direction along said one diameter of the annular core plate; a step of forming the plurality of friction material segments by cutting off the leading edge parts of the plurality of strip-shaped friction materials positioned above the annular core plate along a cutting-off line that includes at least an arc line that follows the outer periphery of the annular core plate; and a step of pressing and bonding the plurality of friction material segments onto the annular flat face coated with an adhesive.

In accordance with this arrangement, the plurality of strip-shaped friction materials are formed by cutting the band-shaped friction material in its longitudinal direction, and the portions of the leading edge parts of these strip-shaped friction materials that correspond to the friction material segments are cut off at the cutting-off line that includes at least the arc line that follows the outer periphery of the annular core plate while the portions are positioned and held in the positions above the annular core plate so as to form the plurality of friction material segments, which are pressed against and bonded to the annular flat face of the annular core plate coated with an adhesive. Therefore, it is possible to increase the degree of freedom in the width and shape of the oil channels between the friction material segments, and moreover the production yield of the friction material segments can be improved.

Furthermore, in accordance with a second aspect of the present invention, there is proposed a device for producing a clutch friction plate by bonding a plurality of friction material segments to an annular flat face of an annular core plate so that oil channels are formed between the friction material segments, the device comprising: support means that is capable of positioning and supporting the annular core plate so that the annular flat face coated with an adhesive faces upward and the annular core plate can be pivoted intermittently around an axis thereof; a rotating receiving blade that rotates at a fixed position so as to be in contact with a lower face of a band-shaped friction material extending in a direction along one diameter of the annular core plate positioned and supported by the support means; one rotating round blade or a plurality of coaxial rotating round blades that rotate so as to be in contact with the outer periphery of the rotating receiving blade and cut the band-shaped friction material along its longitudinal direction to form a plurality of strip-shaped friction materials; a feed roller that is in contact from beneath with the plurality of strip-shaped friction materials in common so as to feed the strip-shaped friction materials toward the annular core plate positioned and supported by the support means; a plurality of urethane rollers that rotate so as to be individually in contact with the upper faces of the strip-shaped friction materials while sandwiching the strip-shaped friction materials between the urethane rollers and the feed roller; a positioning block that aligns and holds portions, corresponding to the friction material segments, of leading edge parts of the plurality of strip-shaped friction materials fed in by the feed roller and the plurality of urethane rollers in positions above the annular core plate while positioning the portions in the peripheral direction and in the direction along said one diameter of the annular core plate; a cutting blade that is vertically movable relative to the annular core plate positioned and supported by the support means and has at least an arc part that follows the outer periphery of the annular core plate; a receiving blade that is fixed to the positioning block in order to cut off, in cooperation with the cutting blade, the leading edge parts of the plurality of strip-shaped friction materials positioned and held by the positioning block to form the plurality of friction material segments; and pressing means that is provided on the cutting blade so that the plurality of friction material segments cut off by the cutting blade and the receiving blade can be pressed against the annular flat face of the annular core plate.

In accordance with this arrangement, the plurality of strip-shaped friction materials are formed by cutting the band-shaped friction material by means of both the rotating receiving blade which is in contact with the lower face of the band-shaped friction material, and one rotating round blade or the plurality of coaxial rotating round blades which rotate while being in contact with the outer periphery of the rotating receiving blade; the plurality of strip-shaped friction materials thus formed are fed toward the annular core plate by means of both the feed roller which is in contact from beneath with the strip-shaped friction materials in common, and the plurality of urethane rollers which are individually in contact with the upper faces of the strip-shaped friction materials; the leading edge parts of the plurality of strip-shaped friction materials positioned and held by the positioning block in the positions above the annular core plate are cut off by means of both the cutting blade which moves vertically and has at least the arc part that follows the outer periphery of the annular core plate, and the receiving blade mounted on the positioning block, so as to form the plurality of friction material segments; and these friction material segments are pressed against the annular flat face by means of the pressing means provided on the cutting blade. Therefore, it is possible to appropriately carry out the production process of the first aspect of the present invention with a simple and inexpensive arrangement while minimizing generation of shaggy cut portions and dust accompanying the cutting.

The above-mentioned object, other objects, characteristics, and advantages of the present invention will become apparent from preferred embodiments that will be described in detail below by reference to the attached drawings.

BRIEF DESCRIPTION OF THE DRAWINGS

FIG. 1 to FIG. 10 show a first embodiment of the present invention, wherein

FIG. 1 is a plan view of a clutch friction plate,

FIG. 2 is a plan view showing a change of a band-shaped friction material when producing the clutch friction plate, FIG. 3 is a diagram showing portions that become scrap after friction material segments are obtained from the band-shaped friction material, FIG. 4 is a plan view of a production device for producing the clutch friction plate, FIG. 5 is an enlarged sectional view along line 5—5 in FIG. 4, FIG. 6 is a sectional view along line 6—6 in FIG. 5, FIG. 7 is a sectional view along line 7—7 in FIG. 4, FIG. 8 is a diagram showing the shape of a receiving blade, FIG. 9 is a sectional view, corresponding to FIG. 5, of cutting-off means and pressing means in an operating state, and FIG. 10 is a sectional view, corresponding to FIG. 6, of the cutting-off means and the pressing means in the operating state.

DESCRIPTION OF THE PREFERRED EMBODIMENTS

Figure 1:
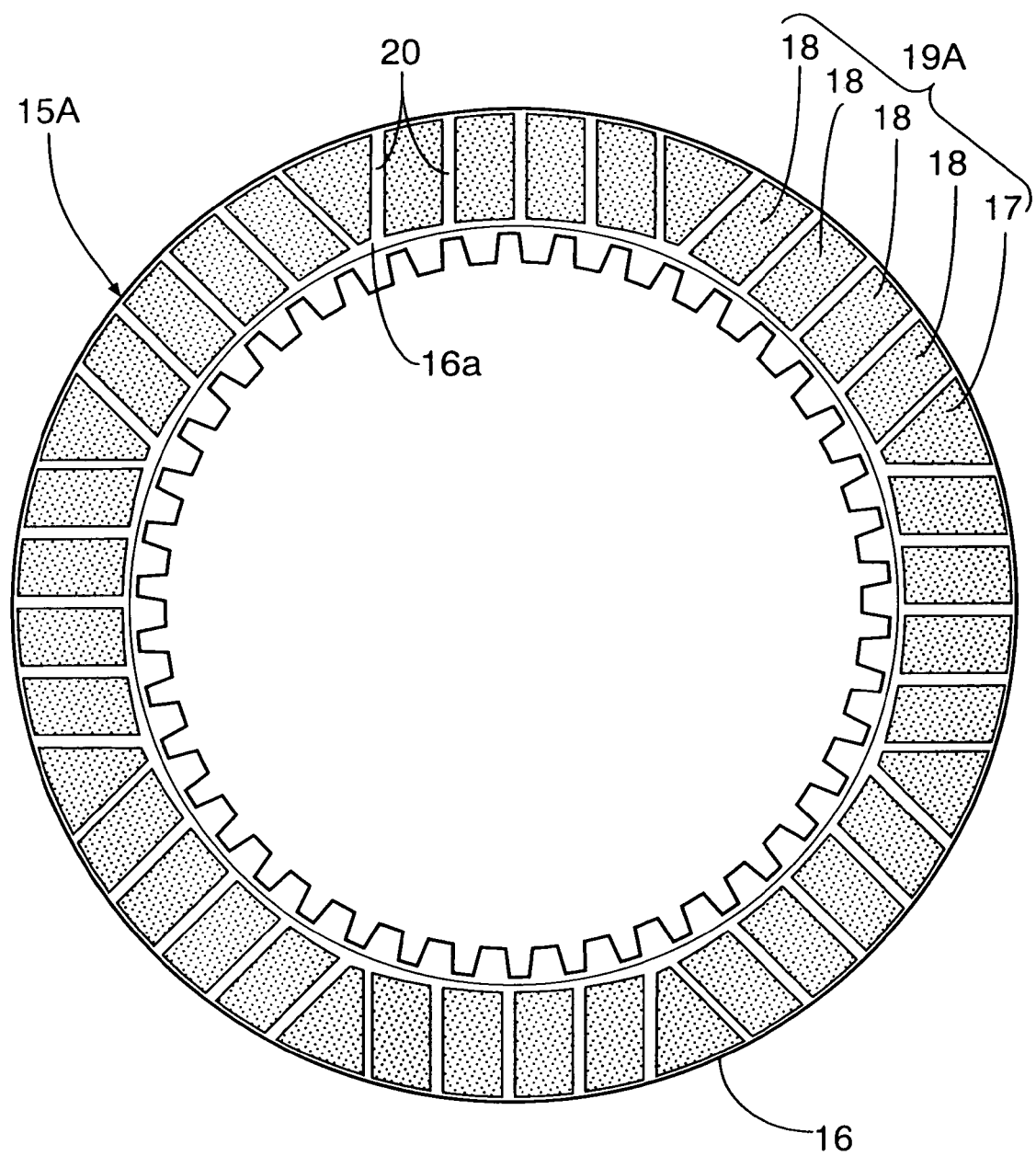

Referring to FIG. 1, a clutch friction plate 15A is formed by bonding, for example, eight segment groups 19A to each of annular flat faces 16a on opposite sides of a metal annular core plate 16. The segment group 19A includes a triangular friction material segment 17 and four rectangular friction material segments 18 which are arranged in an anticlockwise direction from the friction material segment 17, each of the friction material segments 17 and 18 being made of a fiber component, an additive component, a binder component, etc. Oil channels 20 are formed between adjacent friction material segments 17 and 18, and 18 and 18.

Figure 2:
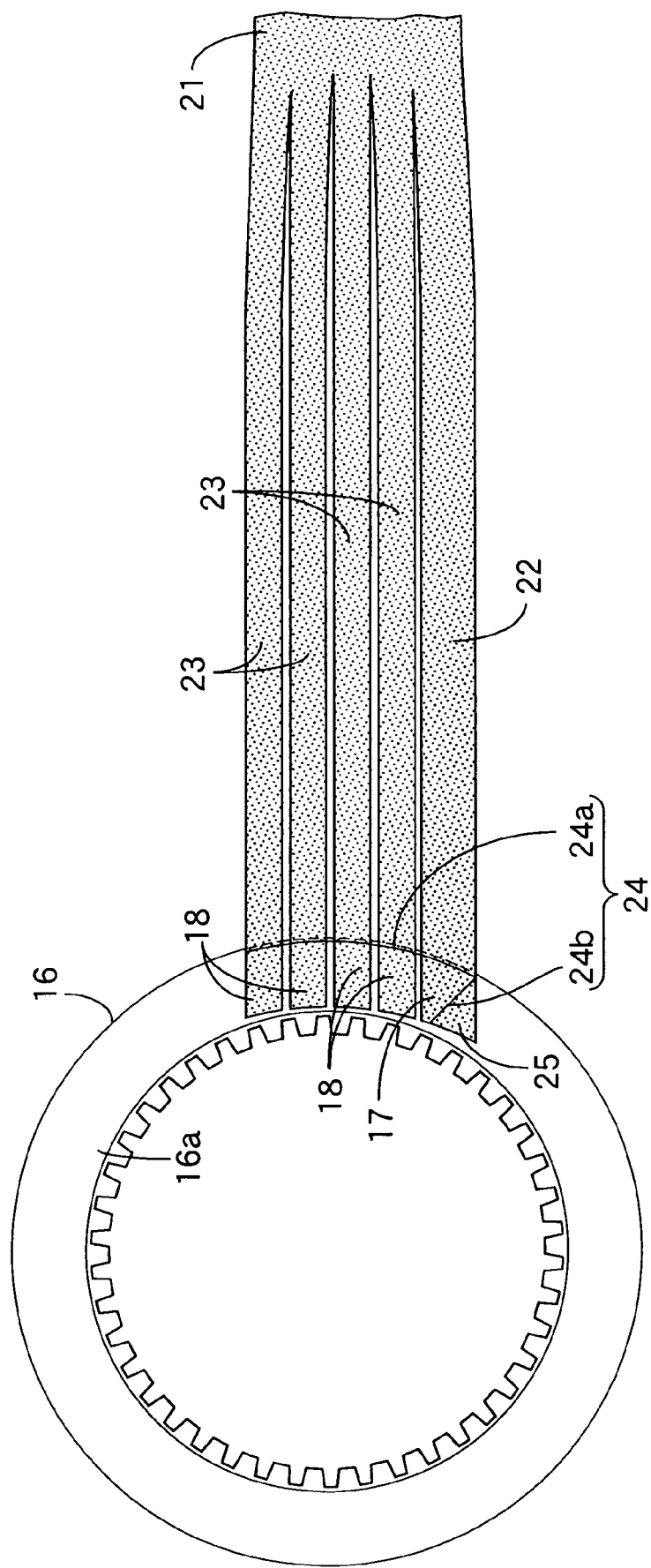

Referring to FIG. 2, when producing the clutch friction plate 15A, one segment group 19A is simultaneously bonded to the annular flat face 16a of the annular core plate 16 by carrying out Steps (a) to (d), which will be described below. By repeating Steps (a) to (d) eight times, the friction material segments 17 and 18 are bonded to the annular flat face 16a on one side of the annular core plate 16.

(a) A band-shaped friction material 21 is cut along its longitudinal direction while being fed in a direction along one diameter of the annular core plate 16 to form a plurality of strip-shaped friction materials 22 and 23. Since one segment group 19A is formed from five friction material segments 17 and 18 in the first embodiment, cutting the band-shaped friction material 21 at four positions at intervals in the width direction thereof forms five strip-shaped friction materials 22 and 23.

(b) Portions, corresponding to the friction material segments 17 and 18, of leading edge parts of the five strip-shaped friction materials 22 and 23 are aligned and held in positions above the annular core plate 16 while their positions are fixed in the peripheral direction and in the direction along said one diameter of the annular core plate 16.

(c) The leading edge parts of the five strip-shaped friction materials 22 and 23 positioned above the annular core plate 16 are cut off at a cutting-off line 24 which contains at least an arc line 24a that follows the outer periphery of the annular core plate 16, to form the five friction material segments 17 and 18. In the first embodiment, among the five friction material segments 17 and 18 forming the segment group 19A, the friction material segment 17, which is at one end along the peripheral direction of the annular core plate 16, that is, the direction in which the friction material segments 17 and 18 are arranged, is triangular, and the cutting-off line 24 therefore contains not only the arc line 24a but also a straight line 24b that intersects the arc line 24a.

(d) The five friction material segments 17 and 18 are pressed against and bonded to the annular flat face 16a which has been coated with an adhesive.

Figure 3:
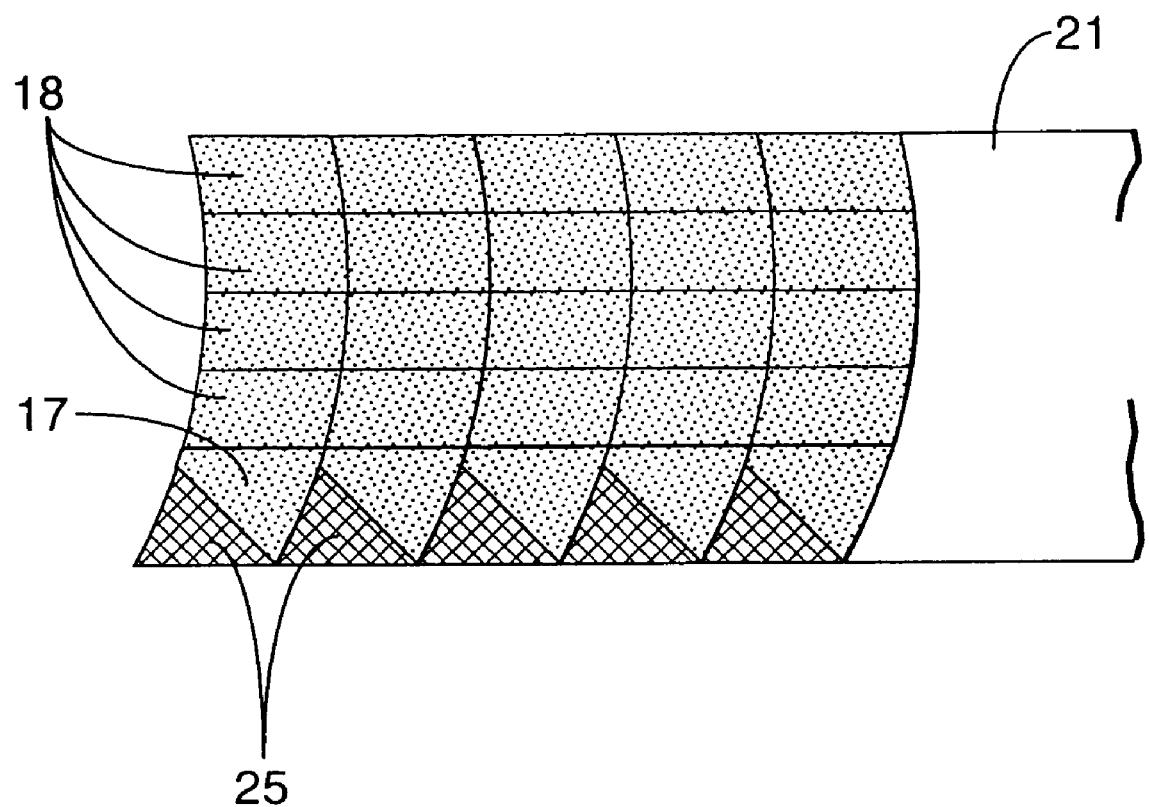

In accordance with this production process, as shown in FIG. 3, since the five friction material segments 17 and 18 forming one segment group 19A are formed so that the segment groups 19A are arranged in sequence along the longitudinal direction of the band-shaped friction material 21, and one friction material segment 17 of each of the groups 19A is triangular, portions shown by the intersecting diagonal lines in FIG. 3 become scrap 25.

Figure 4:
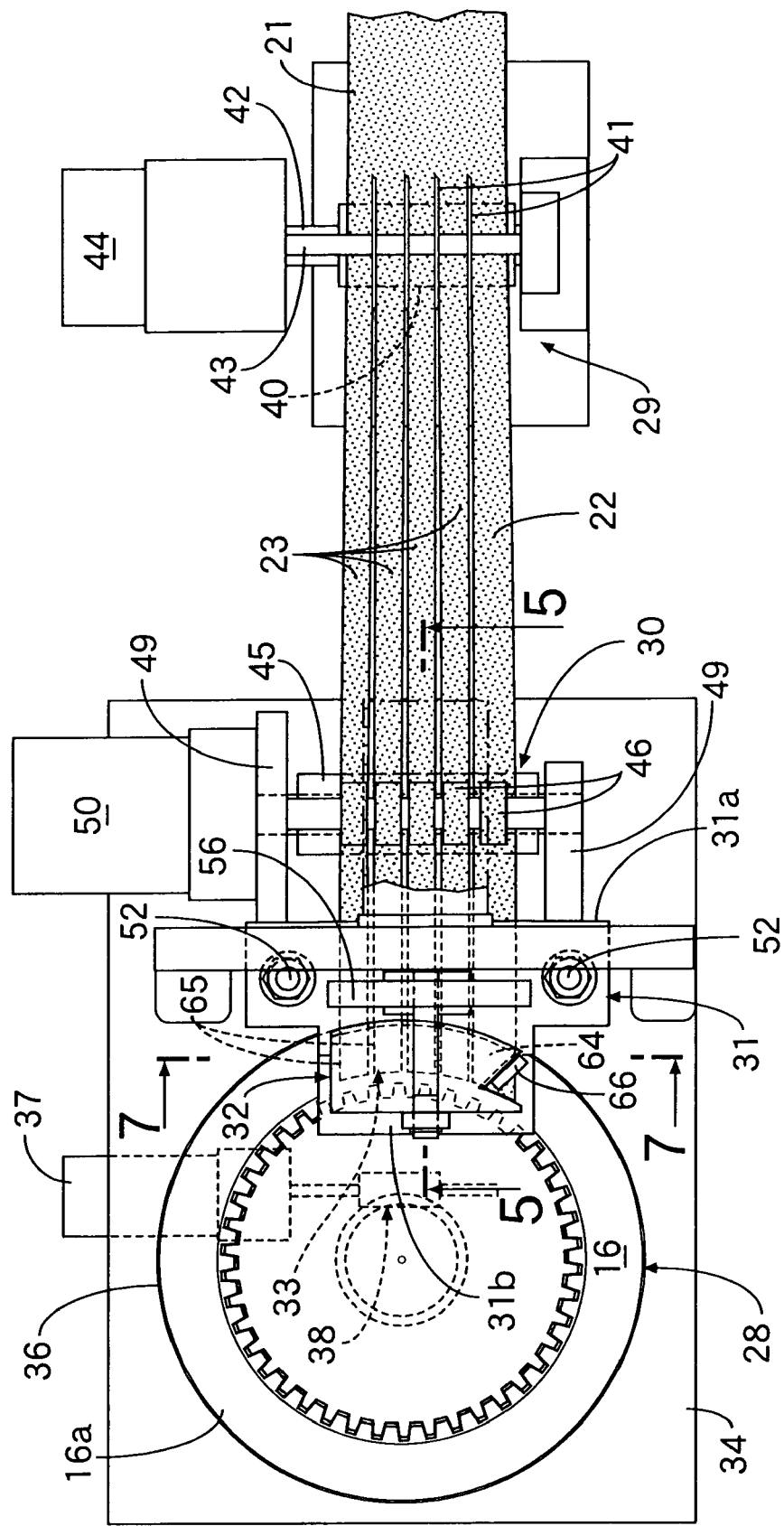

A production device for carrying out the above-mentioned production process is now described. Referring to FIG. 4, this production device includes: support means 28 that can intermittently pivot while positioning and supporting the annular core plate 16 in a manner in which the annular flat face 16a coated with an adhesive faces upward; cutting means 29 that cuts the band-shaped friction material 21 which extends in a direction along one diameter of the annular core plate 16 positioned and supported by the support means 28, at for example four positions to form five strip-shaped friction materials 22 and 23; feeding means 30 for feeding the strip-shaped friction materials 22 and 23 toward the annular core plate 16; a positioning block 31 that holds the portions, corresponding to the friction material segments 17 and 18, of the leading edge parts of the five strip-shaped friction materials 22 and 23 so as to position the portions in the positions above the annular core plate 16; cutting-off means 32 that cuts off the leading edge parts of the five strip-shaped friction materials 22 and 23 positioned and held by the positioning block 31 to form the five friction material segments 17 and 18; and pressing means 33 that presses the cut-off five friction material segments 17 and 18 against the annular flat face 16*a* of the annular core plate 16.

Figure 5:
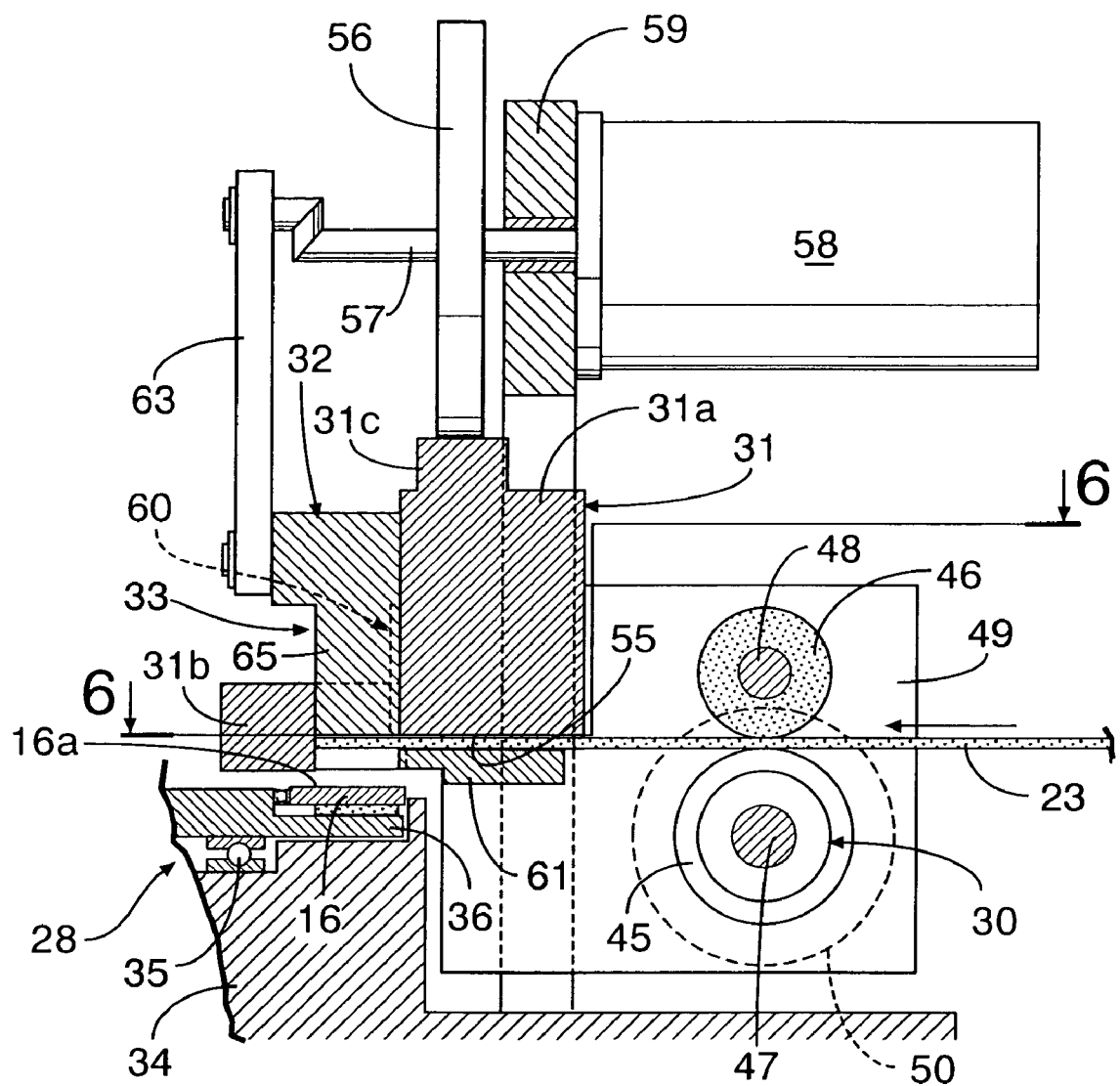
Figure 6:
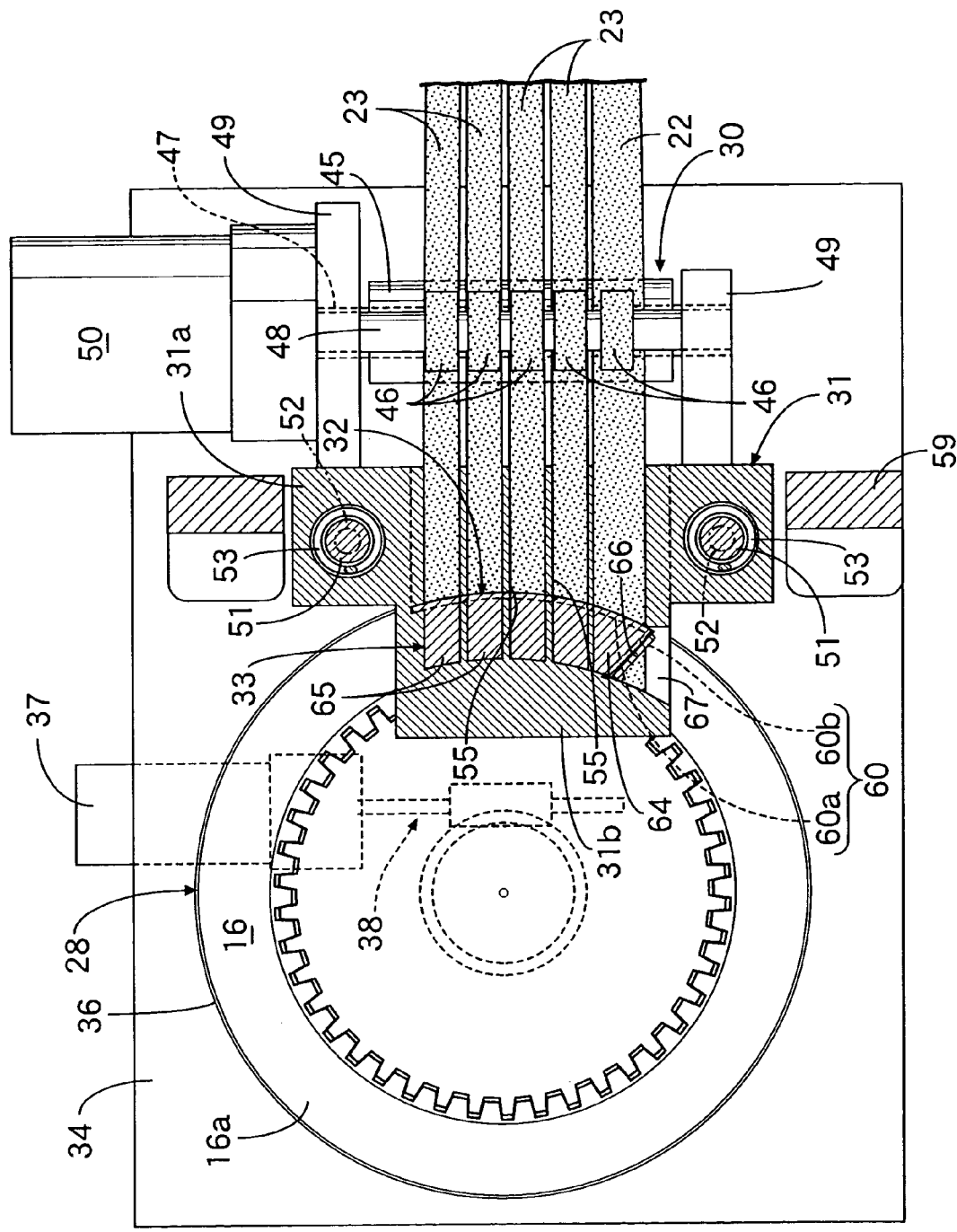

Referring FIG. 5 and FIG. 6 together, the support means 28 includes a disc-shaped support table 36 pivotably supported, via a bearing 35, on a base 34 fixed to the floor, an electric motor 37 supported by the base 34 beneath the support table 36 so that the electric motor 37 exhibits a driving force to pivot the support table 36, and a transmission mechanism 38 provided between the support table 36 and the electric motor 37 so as to transmit the driving force of the electric motor 37 to the support table 36 while reducing its speed.

The annular core plate 16 is positioned and supported on the support table 36 with the axis of the annular core plate 16 aligning with the pivot axis of the support table 36 so that the annular flat face 16*a* coated with an adhesive (not illustrated) faces upward. Operation of the electric motor 37 is controlled so that the annular core plate 16 is made to intermittently pivot around its axis. Since eight segment groups 19A are bonded to the annular flat face 16*a* of the annular core plate 16 in the first embodiment, the electric motor 37 is controlled so that the annular core plate 16, that is, the support table 36, is pivoted intermittently by 45 degrees each time.

Referring again to FIG. 4, the cutting means 29 includes a rotating receiving blade 40 that rotates at a fixed position so as to be in contact with the lower face of the band-shaped friction material 21, and one rotating round blade 41 or a plurality of coaxial rotating round blades 41 that rotate so as to be in contact with the outer periphery of the rotating receiving blade 40 and cut the band-shaped friction material 21 along its longitudinal direction, thus forming a plurality of strip-shaped friction materials 22 and 23. Since the five strip-shaped friction materials 22 and 23 are formed from the band-shaped friction material 21 in the first embodiment, four coaxially rotating round blades 41 rotate so as to be in contact with the outer periphery of the rotating receiving blade 40.

A rotating shaft 42 of the rotating receiving blade 40 and a common rotating shaft 43 of the rotating round blades 41 are connected to a rotating drive source 44 so that the rotating shaft 42 and the rotating shaft 43 rotate in opposite directions in synchronism with each other.

The feeding means 30 includes a feed roller 45 that is in contact from beneath with the strip-shaped friction materials 22 and 23 in common, and a plurality (five in the first embodiment) of urethane rollers 46 that rotate individually in contact with upper faces of the strip-shaped friction materials 22 and 23 while sandwiching the strip-shaped friction materials 22 and 23 between the urethane rollers 46 and the feed roller 45. A rotating shaft 47 of the feed roller 45 is rotatably supported by a pair of support plates 49 arranged on opposite sides of the strip-shaped friction materials 22 and 23, and one end of the rotating shaft 47 is connected to a drive source 50 mounted in one of the support plates 49. A common rotating shaft 48 of the urethane rollers 46 is rotatably supported by the support plates 49 so that the urethane rollers 46 rotate by following the strip-shaped friction materials 22 and 23 fed by the feed roller 45.

Figure 7:
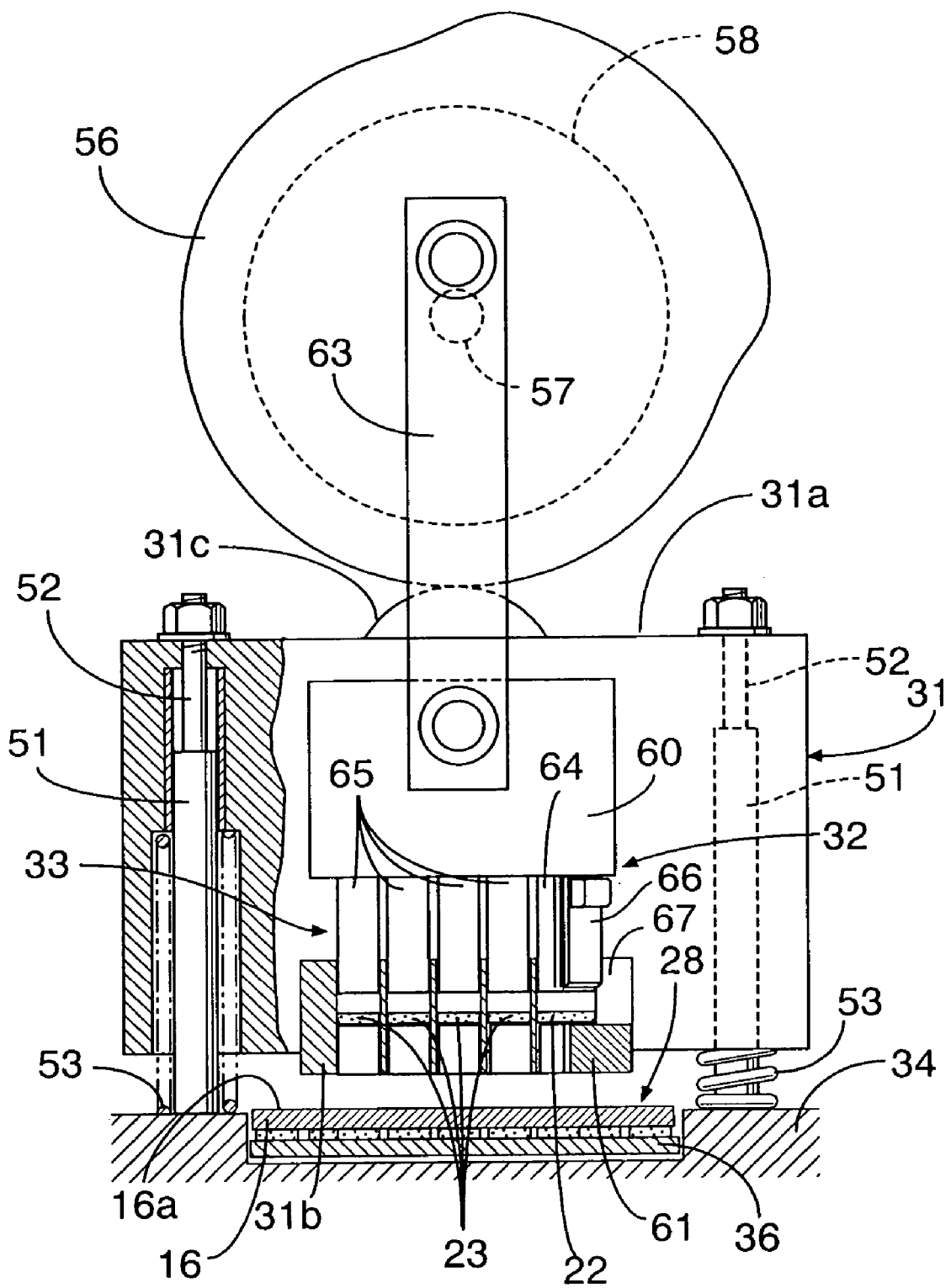

Referring FIG. 7 in addition, the positioning block 31 is disposed between the support table 36 and the feeding means 30 so as to overlap a part of the annular core plate 16 on the support table 36, and is spring-biased upward while being capable of ascending and descending in a limited range. That is, a pair of guide tubes 51 are provided so as to stand on the base 34 on opposite sides of the strip-shaped friction materials 22 and 23, upper ends of mating shafts 52 fitted from above into the guide tubes 51 are secured to the positioning block 31, and a pair of coil springs 53 surrounding the guide tubes 51 are provided under compression between the base 34 and the positioning block 31.

Moreover, the pair of support plates 49 supporting the feeding means 30 are secured to the positioning block 31, so that the feeding means 30 also ascends and descends together with the positioning block 31.

The positioning block 31 integrally includes a block main portion 31*a* having guide grooves 54 and 55 on a lower face, through which the strip-shaped friction materials 22 and 23 are inserted, and a protruding portion 31*b* protruding from a lower part of the block main portion 31*a* toward the annular support plate 16 on the support table 36. The protruding portion 31*b* is formed into a comb shape so as to position the portions, corresponding to the friction material segments 17 and 18, of the leading edge parts of the strip-shaped friction materials 22 and 23 while positioning in the peripheral direction of the annular core plate 16 and in a direction along one diameter of the annular core plate 16. Among the leading edge parts of the strip-shaped friction materials 22 and 23, portions protruding toward the annular core plate 16 from the guide grooves 54 and 55 of the block main portion 31*a* situate at positions fixed by the protruding portion 31*b* in the peripheral direction of the annular core plate 16 and in the direction along said one diameter of the annular core plate 16.

Movement of the strip-shaped friction materials 22 and 23 along the longitudinal direction thereof is stopped while the strip-shaped friction materials 22 and 23 are positioned by the protruding portion 31*b* of the positioning block 31, and during this process the feed roller 45 of the feeding means 30 rotates idle.

A sliding-contact projection 31*c*, which is in resilient sliding contact with a cam 56 disposed above the block main portion 31*a*, is projectingly provided at the upper end of the block main portion 31*a* of the positioning block 31, and a rotating shaft 57 of the cam 56 is connected to a rotating drive source 58. The cam 56 is thus rotated by the rotating drive source 58, and the block main portion 31*a*, that is, the positioning block 31, ascends and descends accompanying the rotation of the cam 56. The rotating drive source 58 is mounted in a support frame 59 fixed to the base 34 on opposite sides of the positioning block 31.

The cutting-off means 32 includes a cutting blade 60 and a receiving blade 61. The cutting blade 60 can move vertically relative to the annular core plate 16 positioned and supported on the support table 36 of the support means 28, and has at least an arc part 60*a* that follows the outer periphery of the annular core plate 16. The receiving blade 61 is fixed to the positioning block 31 so that the receiving blade 61, in cooperation with the cutting blade 60, cuts off the leading edge parts of the strip-shaped friction materials 22 and 23 positioned and held by the positioning block 31 to form the five friction material segments 17 and 18.

Figure 8:
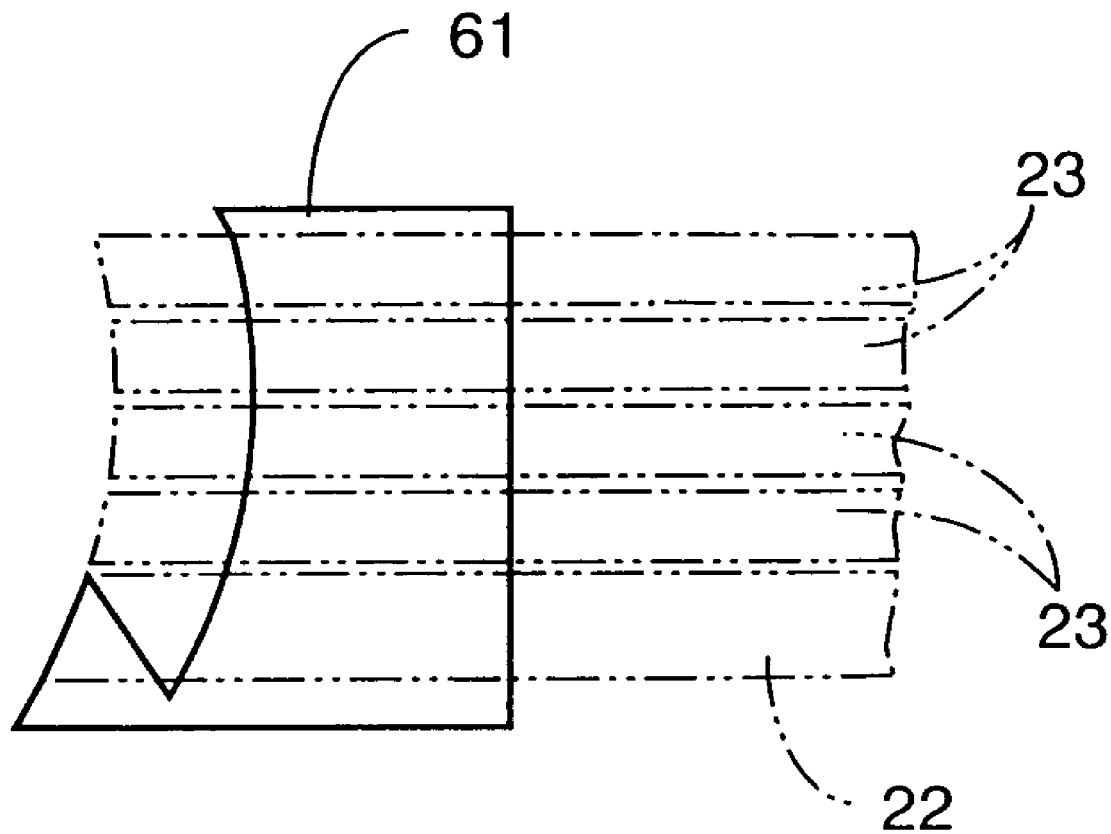

The cutting blade 60 is supported on the positioning block 31 so that it is vertically movable relative to the positioning block 31. A space for allowing the cutting blade 60 to move vertically is formed between the block main portion 31*a* and the protruding portion 31b of the positioning block 31. Furthermore, in the first embodiment, the cutting blade 60 having at least the arc part 60a that follows the outer periphery of the annular core plate 16 includes not only the arc part 60a but also a straight line part 60b that intersects the arc part 60a because, among the five friction material segments 17 and 18 forming the segment group 19A, the friction material segment 17 at one end in the peripheral direction of the annular core plate 16, that is, in the direction in which the friction material segments 17 and 18 are arranged, is triangular. On the other hand, the receiving blade 61 is formed as shown in FIG. 8 so as to correspond to the shape of the cutting blade 60, and is fixed to a lower face of the block main portion 31a so as to block from below the guide grooves 54 and 55 on the lower face of the block main portion 31a of the positioning block 31.

A lower end of a connecting rod 63 extending upward is pivotably connected to the cutting-off means 32 having the cutting blade 60, and an upper end of the connecting rod 63 is pivotably connected to the rotating shaft 57 of the cam 56 at a position that is eccentric with respect to the rotational axis of the rotating shaft 57. The cutting blade 60 therefore moves vertically accompanying rotation of the cam 56, so that the positioning block 31, the receiving blade 61, and the cutting blade 60 can be raised and lowered by the common rotating drive source 58 while the cutting blade 60 can move vertically relative to the positioning block 31 and the receiving blade 61.

The pressing means 33 is formed from a plurality of pressing projections 64 and 65 integrally provided with the cutting blade 60 so as to correspond to the friction material segments 17 and 18 respectively, which are to be bonded to the annular core plate 16. The pressing projections 64 and 65 are formed into a shape such that they are inserted from above into the protruding portion 31b of the positioning block 31 when the cutting blade 60 moves downward relative to the positioning block 31.

When the triangular friction material segment 17 is cut off from the leading edge part of the strip-shaped friction material 22 by means of the cutting blade 60 and the receiving blade 61, the triangular scrap 25 is generated. An opening 67 is provided in a portion of the protruding portion 31b corresponding to this scrap, and the cutting blade 60 is provided with a sweeping-out member 66 for sweeping the scrap 25 remaining on an upper face of the receiving blade 61 outward via the opening 67.

Figure 9:
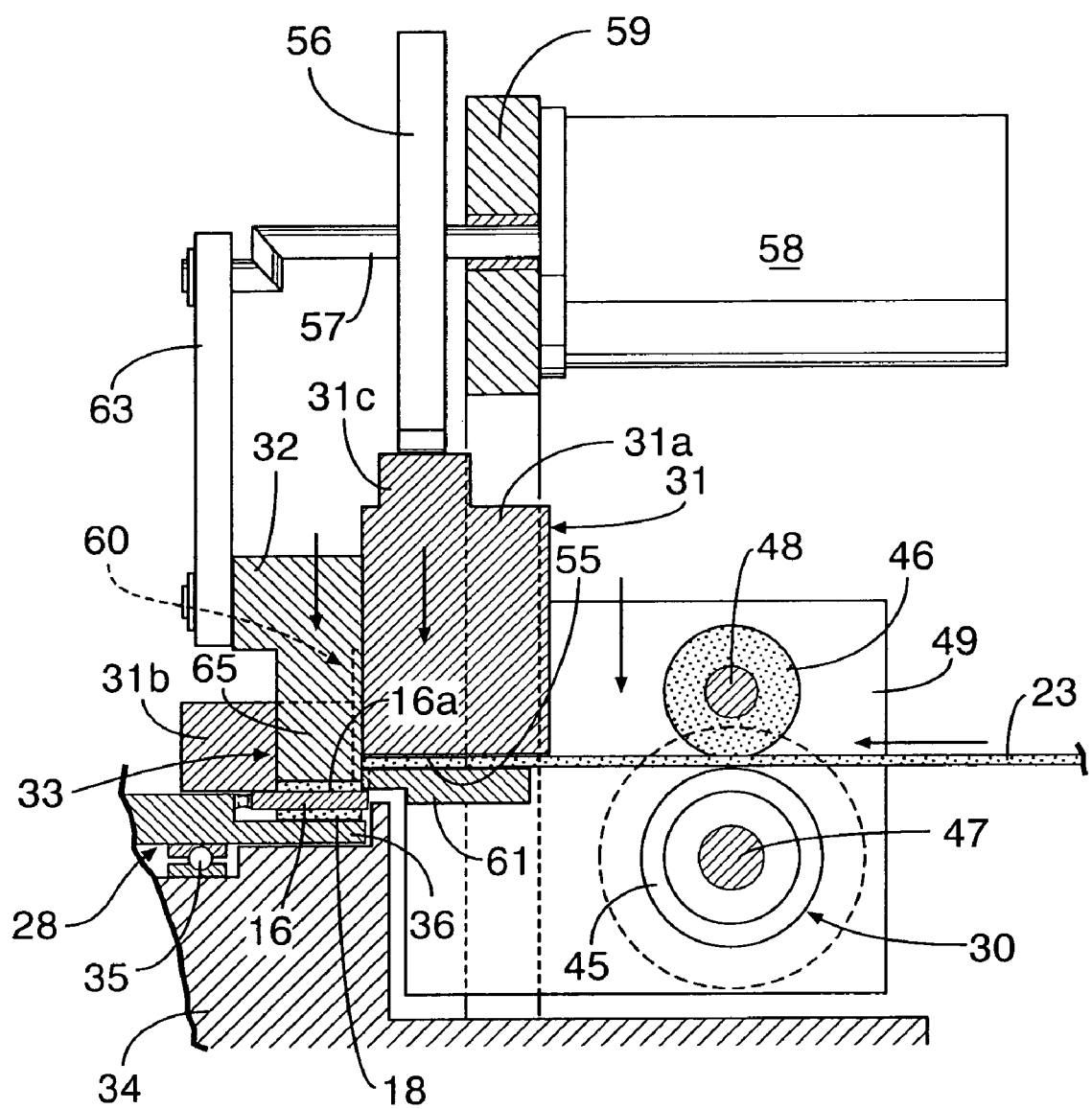
Figure 10:
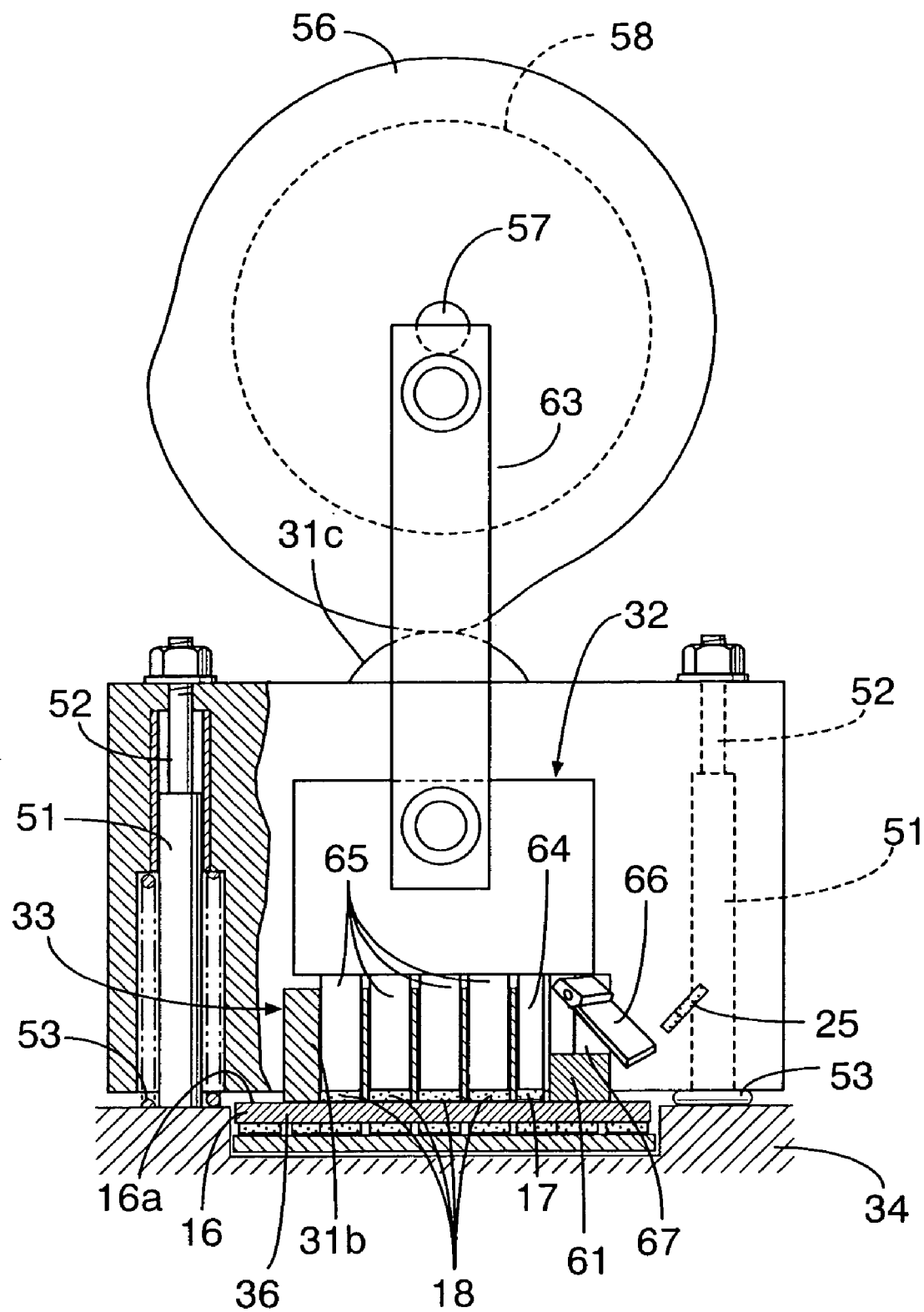

Movements of the positioning block 31, the cutting-off means 32, and the pressing means 33 are described with reference to FIG. 9 and FIG. 10. The strip-shaped friction materials 22 and 23 fed by the feeding means 30 are positioned and held by the positioning block 31, which is present at a relatively high position as shown in FIG. 5 and FIG. 7, and are then moved directly above the annular core plate 16 on the support table 36 as the positioning block 31 descends. Subsequently, the cutting blade 60 moves downward relative to the positioning block 31, thereby cutting off the friction material segments 17 and 18 from the leading edge parts of the strip-shaped friction materials 22 and 23 by means of the cutting blade 60 and the receiving blade 61. When the cutting blade 60 then further descends as shown in FIG. 9 and FIG. 10, the friction material segments 17 and 18 are pressed downward by the pressing projections 64 and 65 of the pressing means 33 while being guided by the positioning block 31 and the receiving blade 61, and pressed against the annular flat face 16a of the annular core plate 16, which has been coated with an adhesive.

The operation of the first embodiment is now described. When the plurality of, for example five, friction material segments 17 and 18 are bonded to the annular flat face 16a of the annular core plate 16 so that the oil channels 20 are formed between the friction material segments 17 and 18, and between 18 and 18, the band-shaped friction material 21 is cut in its longitudinal direction to form the plurality of, for example five, strip-shaped friction materials 22 and 23; portions, corresponding to the friction material segments 17 and 18, of the leading edge parts of the strip-shaped friction materials 22 and 23 are cut off at the cutting-off line 24 that contains at least the arc line 24a that follows the outer periphery of the annular core plate 16 (the cutting-off line 24 containing the arc line 24a and the straight line 24b in the first embodiment) while the portions are positioned and held in the positions above the annular core plate 16 to form the plurality of, for example five, friction material segments 17 and 18; and the friction material segments 17 and 18 are pressed against and bonded to the annular flat face 16a of the annular core plate 16, which has been coated with an adhesive.

In accordance with such a production process, in comparison with a conventional arrangement in which friction material segments obtained by cutting in sequence from the leading edge part of the band-shaped friction material 21 fed in a direction along a tangent to the annular core plate 16 are bonded to the annular core plate 16, the degree of freedom in the width and shape of the oil channels 20 between the friction material segments 17 and 18, and between 18 and 18 can be increased.

Figure 11:
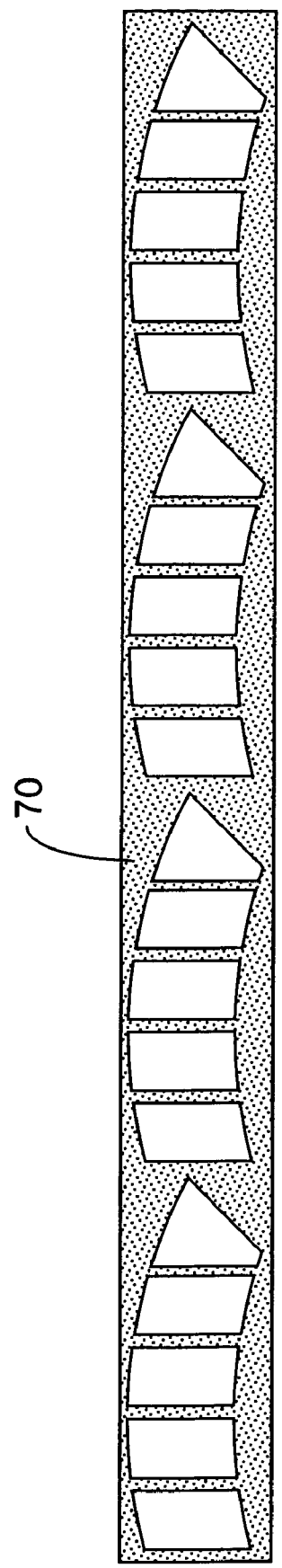
FIG. 11 is a diagram showing scrap in a conventional example in which friction material segments are obtained by punching out.

Furthermore, in a conventional arrangement in which a plurality of friction material segments obtained by punching out the band-shaped friction material 21 are bonded to the annular core plate 16, as shown in FIG. 11, a large amount of scrap 70 is generated after the punching out, whereas in the first embodiment as shown in FIG. 3 only the scrap 25 having a small area is generated, thus improving the production yield of the friction material segments 17 and 18.

Moreover, in the production device for producing the clutch friction plate 15A, the band-shaped friction material 21 is cut by means of both the rotating receiving blade 40 which is in contact with the lower face of the band-shaped friction material 21, and one rotating round blade 41 or a plurality (four in the first embodiment) of coaxial rotating round blades 41 which rotate so as to be in contact with the outer periphery of the rotating receiving blade 40, thus forming the plurality of strip-shaped friction materials 22 and 23; the plurality of strip-shaped friction materials 22 and 23 thus formed are fed toward the annular core plate 16 by means of both the feed roller 45 which is in contact from beneath with the strip-shaped friction materials 22 and 23 in common, and the plurality (five in the first embodiment) of urethane rollers 46 which rotate in individual contact with the upper faces of the strip-shaped friction materials 22 and 23; the leading edge parts of the plurality of strip-shaped friction materials 22 and 23 positioned and held in the positions above the annular core plate 16 by the positioning block 31 are cut off by means of both the cutting blade 60 which moves vertically and has at least the arc part 60a that follows the outer periphery of the annular core plate 16 (the cutting blade 60 containing the arc part 60a and the straight line part 60b in the first embodiment), and the receiving blade 61 mounted on the positioning block 31, thus forming the plurality of friction material segments 17 and 18; and these friction material segments 17 and 18 are pressed against the annular flat face 16a by the pressing means 33 provided on the cutting blade 60.

In this way, the rotating receiving blade 40 and the rotating round blades 41 are used when the strip-shaped friction materials 22 and 23 are formed by cutting the band-shaped friction material 21, and the cutting blade 60 and the receiving blade 61 are used when the friction material segments 17 and 18 are cut off from the leading edge parts of the strip-shaped friction materials 22 and 23. Therefore, it is possible to minimize generation of shaggy cut portions and dust accompanying the cutting, and to appropriately carry out the above-mentioned production process with a simple and inexpensive arrangement as compared with an arrangement employing a punching-out die.

Figure 12:
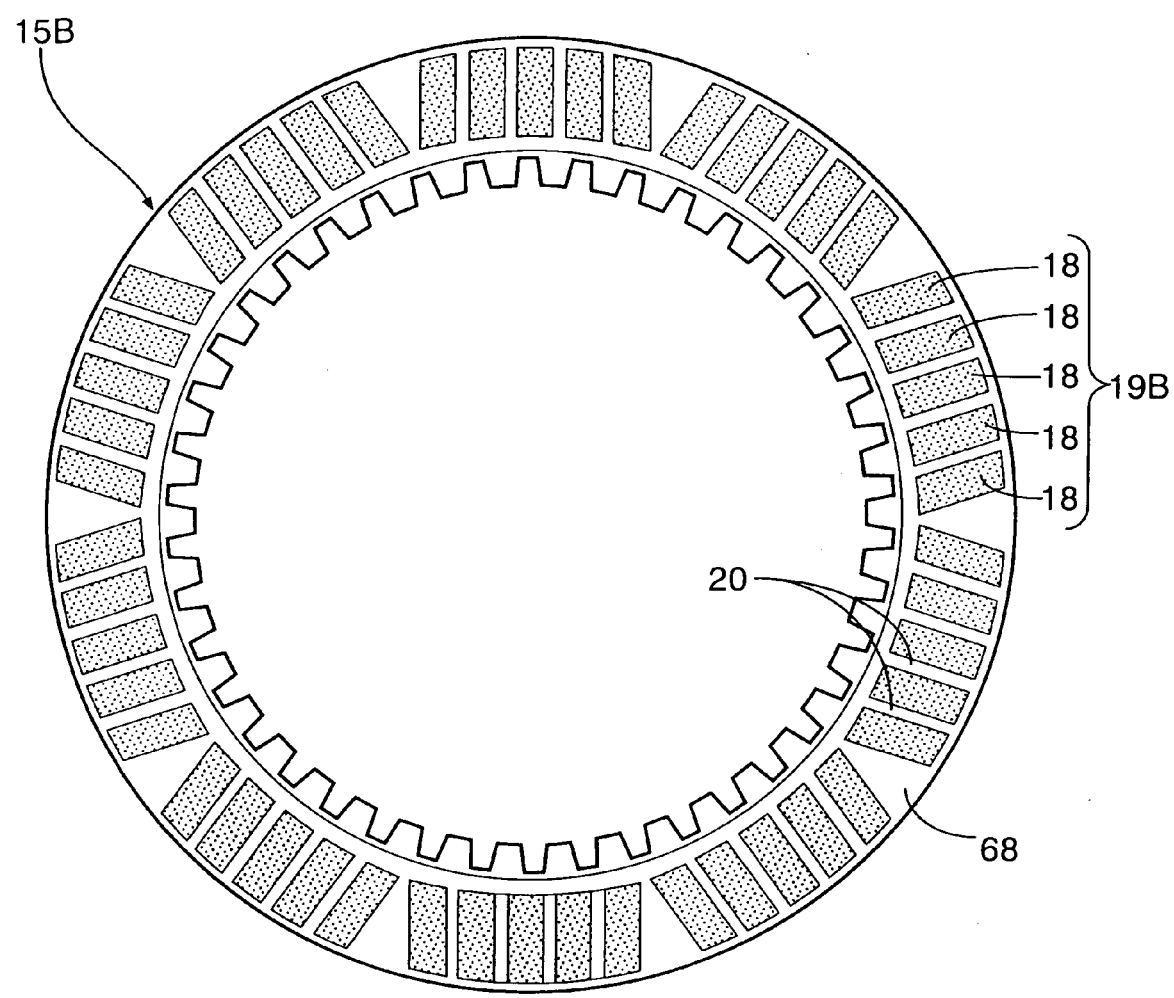
FIG. 12 is a plan view of a clutch friction plate of a second embodiment.

FIG. 12 shows a second embodiment of the present invention. A clutch friction plate 15B is formed by bonding, to annular flat faces 16a on opposite sides of a metal annular core plate 16, for example, ten segment groups 19B each containing a plurality of, for example five, friction material segments 18 having an identical shape and being parallel to each other so that oil channels 20 are formed between adjacent friction material segments 18 of each group 19B and triangular oil channels 68 are formed between the groups 19B.

In accordance with this second embodiment, the cutting-off line used when cutting off the friction material segments 18 from five strip-shaped friction materials may contain only an arc line, the arrangement of cutting-off means 32 in the production device can be further simplified, and moreover no scrap is generated, thus increasing the yield to 100%.

Although embodiments of the present invention have been described in detail above, the present invention is not limited to the above-mentioned embodiments and can be modified in a variety of ways without departing from the subject matter of the present invention.

What is claimed is:

1. A process for producing a clutch friction plate by bonding a plurality of friction material segments to an annular flat face of an annular core plate so that oil channels are formed between the friction material segments, the process comprising:
   a step of forming a plurality of strip-shaped friction materials by cutting a band-shaped friction material along its longitudinal direction while feeding the band-shaped friction material in a direction along one diameter of the annular core plate;
   a step of aligning and holding portions, corresponding to the friction material segments, of leading edge parts of the plurality of strip-shaped friction materials in positions above the annular core plate while positioning the portions in the peripheral direction and in the direction along said one diameter of the annular core plate;
   a step of forming the plurality of friction material segments by cutting off the leading edge parts of the plurality of strip-shaped friction materials positioned above the annular core plate along a cutting-off line that includes at least an arc line that follows the outer periphery of the annular core plate; and
   a step of pressing and bonding the plurality of friction material segments onto the annular flat face coated with an adhesive.

2. A device for producing a clutch friction plate by bonding a plurality of friction material segments to an annular flat face of an annular core plate so that oil channels are formed between the friction material segments, the device comprising:
   support means that is capable of positioning and supporting the annular core plate so that the annular flat face coated with an adhesive faces upward and the annular core plate can be pivoted intermittently around an axis thereof;
   a rotating receiving blade that rotates at a fixed position so as to be in contact with a lower face of a band-shaped friction material extending in a direction along one diameter of the annular core plate positioned and supported by the support means;
   one rotating round blade or a plurality of coaxial rotating round blades that rotate so as to be in contact with the outer periphery of the rotating receiving blade and cut the band-shaped friction material along its longitudinal direction to form a plurality of strip-shaped friction materials;
   a feed roller that is in contact from beneath with the plurality of strip-shaped friction materials in common so as to feed the strip-shaped friction materials toward the annular core plate positioned and supported by the support means;
   a plurality of urethane rollers that rotate so as to be individually in contact with the upper faces of the strip-shaped friction materials while sandwiching the strip-shaped friction materials between the urethane rollers and the feed roller;
   a positioning block that aligns and holds portions, corresponding to the friction material segments, of leading edge parts of the plurality of strip-shaped friction materials fed in by the feed roller and the plurality of urethane rollers in positions above the annular core plate while positioning the portions in the peripheral direction and in the direction along said one diameter of the annular core plate;
   a cutting blade that is vertically movable relative to the annular core plate positioned and supported by the support means and has at least an arc part that follows the outer periphery of the annular core plate;
   a receiving blade that is fixed to the positioning block in order to cut off, in cooperation with the cutting blade, the leading edge parts of the plurality of strip-shaped friction materials positioned and held by the positioning block to form the plurality of friction material segments; and
   pressing means that is provided on the cutting blade so that the plurality of friction material segments cut off by the cutting blade and the receiving blade can be pressed against the annular flat face of the annular core plate.

* * * * *